(12) United States Patent
Foltin

(10) Patent No.: US 11,541,790 B2
(45) Date of Patent: Jan. 3, 2023

(54) METHOD AND DEVICE FOR ADAPTING A POSITION OF A SEAT DEVICE OF A VEHICLE DURING AND/OR PRIOR TO A SWITCHOVER OF THE VEHICLE FROM AN AUTOMATED DRIVING MODE TO A MANUAL DRIVING MODE

(71) Applicant: Robert Bosch GmbH, Stuttgart (DE)

(72) Inventor: Johannes Ludwig Foltin, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 555 days.

(21) Appl. No.: 16/660,336

(22) Filed: Oct. 22, 2019

(65) Prior Publication Data

US 2020/0130546 A1 Apr. 30, 2020

(30) Foreign Application Priority Data

Oct. 24, 2018 (DE) .......................... 102018218192.6

(51) Int. Cl.
*B60N 2/66* (2006.01)
*G05D 1/00* (2006.01)
(Continued)

(52) U.S. Cl.
CPC .......... *B60N 2/6673* (2015.04); *B60N 2/919* (2018.02); *B60W 50/0098* (2013.01); *B60W 60/0059* (2020.02); *G05D 1/0061* (2013.01); *B60W 2040/0818* (2013.01)

(58) Field of Classification Search
CPC .... B60N 2/6673; B60N 2/919; B60N 2/0244; B60N 2/0276; B60N 2/0224; B60N 2/22;
(Continued)

(56) References Cited

U.S. PATENT DOCUMENTS 9,581,460 B1 * 2/2017 McNew ................. B60W 50/08
11,299,067 B2 * 4/2022 Kobayashi ............... B60N 2/22
(Continued)

*Primary Examiner* — Jeff A Burke
*Assistant Examiner* — Kyle T Johnson
(74) *Attorney, Agent, or Firm* — Norton Rose Fulbright US LLP; Gerard Messina

(57) ABSTRACT

A method is described for adapting a position of a seat device of a passenger of a vehicle during and/or prior to a switchover of the vehicle from an automated driving mode to a manual driving mode, the method having at least a step of providing, in which an adjustment signal is provided to an interface to a seat device of the vehicle using a transition signal and a position signal, and the adjustment signal causes a change in the position of the seat device from a comfort position to an upright position, and the transition signal indicates or represents an upcoming transition from an automated driving mode to a manual driving mode of the vehicle, and the position signal indicates or represents the position of the seat device of the passenger, the provision of the adjustment signal taking place when the position signal indicates or represents the comfort position, and/or the provision not taking place when the position signal indicates or represents the upright position; and/or providing a blocking signal in response to the transition signal when the position signal indicates or represents an upright position, the blocking signal blocking an adjustment of the upright position to a comfort position by the passenger.

12 Claims, 2 Drawing Sheets

(51) Int. Cl.
   *B60W 50/00* (2006.01)
   *B60N 2/90* (2018.01)
   *B60W 60/00* (2020.01)
   *B60W 40/08* (2012.01)

(58) Field of Classification Search
   CPC .......... B60N 2/42745; B60W 50/0098; B60W 2040/0818; B60R 16/02; G05D 1/0061; G05D 3/00
   See application file for complete search history.

(56) References Cited

U.S. PATENT DOCUMENTS

| | | | | |
|---|---|---|---|---|
| 2010/0109406 A1* | 5/2010 | Ueda | .................. | B60N 2/165 297/358 |
| 2015/0251566 A1* | 9/2015 | Cuddihy | .............. | G05D 1/0088 296/65.09 |
| 2017/0028987 A1* | 2/2017 | Yamada | ............... | G05D 1/0061 |
| 2017/0101032 A1* | 4/2017 | Sugioka | ............... | B60N 2/0881 |
| 2017/0113689 A1* | 4/2017 | Gordon | ............... | B60W 30/182 |
| 2018/0196427 A1* | 7/2018 | Majumdar | ........... | B60W 40/09 |
| 2018/0208080 A1* | 7/2018 | Hirayama | ........... | B60N 2/0224 |
| 2018/0222360 A1* | 8/2018 | Fournier | ........... | B60R 21/01516 |
| 2018/0244174 A1* | 8/2018 | Tan | .......................... | B60N 2/22 |
| 2019/0011914 A1* | 1/2019 | Park | ..................... | B60W 40/08 |
| 2019/0111807 A1* | 4/2019 | Hassenpflug | ........ | B60N 2/0276 |
| 2019/0163176 A1* | 5/2019 | Wang | ................... | G05D 1/0038 |
| 2019/0299897 A1* | 10/2019 | Gramenos | ............ | B60N 2/4235 |
| 2020/0064833 A1* | 2/2020 | Fox | ...................... | B60W 60/0057 |
| 2020/0130546 A1* | 4/2020 | Foltin | ................... | B60N 2/919 |
| 2020/0130680 A1* | 4/2020 | Cho | ......................... | B60N 2/22 |
| 2021/0016805 A1* | 1/2021 | Oba | ......................... | G06T 3/00 |
| 2021/0080949 A1* | 3/2021 | Takeda | .................... | B62D 1/06 |
| 2021/0309123 A1* | 10/2021 | Kang | ...................... | B60R 7/02 |
| 2021/0309124 A1* | 10/2021 | Fields | ................. | B60W 30/095 |
| 2021/0323446 A1* | 10/2021 | Christensen | ......... | B60N 2/4235 |

* cited by examiner

METHOD AND DEVICE FOR ADAPTING A POSITION OF A SEAT DEVICE OF A VEHICLE DURING AND/OR PRIOR TO A SWITCHOVER OF THE VEHICLE FROM AN AUTOMATED DRIVING MODE TO A MANUAL DRIVING MODE

FIELD OF THE INVENTION

The present invention is based on a device or a method according to the definition of the species in the independent claims. A computer program is also a subject matter of the present invention.

BACKGROUND INFORMATION

Vehicles are equipped with seat devices which are able to be electrically or manually adjusted, a position of the seat device being adaptable as a function of an accident risk in order to protect a vehicle occupant.

SUMMARY

Against this background, the approach presented here provides a method for adapting a position of a seat device of a vehicle during and/or prior to a switchover of the vehicle from an automated driving mode to a manual driving mode; it furthermore provides a device that uses this method, and finally introduces a corresponding computer program, as recited in the main claims. The measures introduced in the dependent claims allow for advantageous further developments of and improvements in the device as set forth in the independent claim.

The method introduced here is based on the approach of adjusting a position of a seat device of a vehicle from a comfort position to an upright position during and/or prior to a switchover of the vehicle from an automated driving mode to a manual driving mode, for instance because of a malfunction of a vehicle sensor and/or a looming accident risk, with the goal of allowing a vehicle driver to rapidly and safely assume the driving task as well as the safe control of the vehicle through an adaptation of his position of a seat device, thereby making it possible to minimize an injury risk of the passengers and to increase traffic safety.

A method is introduced for adapting a position of a seat device of a vehicle during and/or prior to a switchover of the vehicle from an automated driving mode to a manual driving mode, the method having at least the following step:

Providing an adjustment signal to an interface to a seat device of the vehicle using a transition signal and a position signal, the adjustment signal causing a change in the position of the seat device from a comfort position to an upright position, the transition signal indicating or representing an upcoming transition from an automated driving mode to a manual driving mode of the vehicle, and the position signal indicating or representing the position of the seat device, the provision of the adjustment signal taking place when the position signal indicates or represents the comfort position and/or the provision not taking place when the position signal indicates or represents the upright position, and/or providing a blocking signal in response to the transition signal when the position signal indicates or represents an upright position, the blocking signal blocking an adjustment of the upright position to a comfort position by the passenger.

In addition to a direct adaptation of the seat device by adjusting the position of a seat device, the driver may additionally or alternatively be provided with an optical, acoustic and/or haptic item of information, by which the driver and/or a further passenger is/are prompted to adjust the seat. Compared to an automated, direct adaptation of the position of a seat device, this allows for an indirect adjustment of the position of a seat device by involving the driver and/or the passenger. This solution is not only cost-effective but also allows the driver and/or passengers to adapt the position of a seat device at a point in time that is ideal for them. It would furthermore be conceivable that the seat adjustment is part of the switchover (i.e., the seat is first brought into a corresponding position and the transfer then takes place as part of the switchover). However, it would also be conceivable that an adjustment but no transfer takes place. It could also be that only the blocking of the seat is executed, as the case may be. Instead of an automated transfer to an upright position, it would thus also be possible to output an item of information to the passenger to assume an upright position. The seat adjustment in the direction of the reclining position, for example, may be blocked in such a case.

A vehicle could be a vehicle for transporting passengers such as a vehicle that drives in a highly automated manner. A passenger may be a vehicle driver or a front-seat passenger or some other passenger (i.e. a vehicle occupant) of a vehicle. A seat device, for example, may involve an adjustable seat and/or a seat bench in a vehicle. An automated driving mode may be understood as a driving mode of a vehicle in which a driver assistance system, for example, executes certain driving maneuvers nearly completely or completely on its own. For instance, when driving on an expressway, a vehicle may assume the complete control, including passing and evasive maneuvers. Toward this end, the vehicle is capable of communicating with its environment and of interacting with other vehicles, for example. In an assisted driving mode, a driver should not take his eyes off the situation on the road at any time so that he can intervene in an emergency situation, if necessary. In an automated driving mode, the driver may intermittently tend to other things and has to be able to intervene only when prompted, for instance within 10 seconds, in order to resume the vehicle control. During the period in which the driver leaves the driving task to the vehicle, he may occupy himself with other things or assume a more comfortable seated position or position of a seat device such as a comfort position. A manual driving mode may be understood as a manual control, e.g., a linear and transverse control, of a vehicle by a vehicle driver. The adjustment signal may include an item of information pertaining to a preferred change in the position of a seat device of a vehicle. Using the adjustment signal, for example, an electrically controlled seat adjustment is able to be actuated. In an upright position, for example, the passenger may sit upright in the seat device, and in the comfort position, the passenger may recline in the seat device, for instance. The position signal may indicate an angular position of a backrest of a seat device, for example.

In an automated driving mode of a vehicle such as highly automated driving at level 3, the vehicle driver should be able to retake control of the vehicle or a driving task within a predefined period of time such as 10 seconds. This is particularly the case when an automated driving mode is concluded, e.g., when leaving an expressway, and/or when a driver assistance system is not available, for instance because of unfavorable environmental conditions. It is conceivable that a vehicle driver is responsible for the guidance or control of the vehicle at all times, which means also during the automated driving mode. Ideally, the vehicle driver is always in a seated position from which the vehicle driver is able to react to different situations in road traffic in a safe and comfortable manner. For optimal steering and/or an optimal operation of a pedal system of a vehicle, for example, an upright seat position is advantageous with a person-dependent distance and angle of a seat device in which the vehicle driver is seated in relation to a steering device and the pedal system. If the driver is in a comfort position when a component malfunction occurs, then he must be brought into an upright seated position or an upright position of a seat device that is required for manual driving. At the same time, the driver must familiarize himself with the traffic situation that he may possibly have neglected while occupied with other things during the automated driving.

During automated driving, for instance, it is currently not possible to adjust a position of a seat device to a comfortable and relaxing position for the vehicle driver. For example, the seat devices may be restricted in their possible adjustments as soon as an automated driving mode of a vehicle is activated. Through concept studies it has been shown that a vehicle driver may be seated in a seated position or in a position of a seat device other than the upright position during an automated driving operation. It would be a clear competitive advantage to satisfy the wish of the vehicle driver to be able to be seated more comfortably while the vehicle is driving in an automated manner. Manufacturers that simply rule out any adjustment of a seated position or a position of a seat device during an automated driving mode of a vehicle would be at a disadvantage on account of the less attractive function for the consumer.

Thus, the particular advantages of the present approach are that a vehicle driver is able to be offered as many seating options as possible within the framework of automated driving; however, these would have to be backed up in terms of safety. The possibility of adjusting a seat position from an upright position to a comfort position appears attractive to the consumer because the consumer experiences fewer restrictions. An available seating freedom in an automated driving mode is ensured in that in a switchover of the vehicle from an automated driving mode to the manual driving mode, e.g., because of a sensor malfunction and/or a looming accident risk, a seated position of the vehicle driver and/or further passengers of the vehicle is adapted in such a way that they are in a position that allows the vehicle driver to rapidly and safely assume the driving task and a safe control of the vehicle, thereby making it possible to minimize an injury risk of the passengers and to increase road safety.

According to one specific embodiment, the present method may have a step of determining the transition signal, the transition signal being determined using a probability value. The probability value represents an item of information pertaining to a probability of a spontaneous switchover of the vehicle from an automated driving mode to a manual driving mode and/or an item of information pertaining to a remaining period of time and/or a remaining driving distance until the vehicle is switched from an automated driving mode to a manual driving mode. A spontaneous and/or unscheduled switchover of the vehicle from an automated driving mode to a manual driving mode, for example, may take place when a vehicle sensor of a driver assistance system malfunctions and/or in case of an error report of a vehicle sensor, so that an automated execution of the driving task of a vehicle can no longer be ensured, thereby resulting in a greater accident risk under certain circumstances. Such a specific embodiment of the approach presented here thus offers the advantage of allowing for an anticipatory reaction of the vehicle with the aid of the probability value, so that the vehicle driver is able to adequately prepare for the assumption of the driving task. An aforementioned malfunction may be understood not only as a complete failure of a component, e.g., due to a cable fracture, but also as a partial malfunction in which the function of the sensor is basically still available but no longer provides the desired quality. For example, this is the case when an environment sensor is at least partially "blind" due to the buildup of ice and/or an accumulation of dirt, and thus is no longer able to measure the objects to be measured quite as well as in a free and clean condition. The buildup of dirt, ice or the blinding of the sensor may occur gradually and is able to be measured and evaluated. Based on the measuring results, it is possible to determine the point at which the quality of the measurements is no longer sufficient, which may also be called a failure of the sensor for a particular functionality, e.g., automated driving. A (navigation) map in combination with a positioning sensor may also be understood as a sensor, as does information from other vehicles in the environment of the ego vehicle. A failure may not only mean a failure of an environment sensor (e.g., radar, camera) directly but also an impairment of a communications device, for example, so that the required information is no longer able to be received completely and/or correctly. This may be the case when ice has accumulated or in the presence of atmospheric disturbances, for example.

According to one further specific embodiment, in the step of determining, the transition signal is able to be determined using an environment signal received via an interface to an environment sensor of the vehicle, and in the step of providing, an adjustment signal is executed when the environment signal represents a change in the weather and/or a change in the time of day, as a result of which a switchover of the vehicle from an automated driving mode to a manual driving mode takes place. In this context, an environment sensor of the vehicle is able to monitor changes in the weather; in this context, an approaching storm, snow flurries, rain and/or fog, for example, could restrict a safe execution of an automated driving mode of a vehicle so that a seat device is adjusted to an upright position and/or an adjustment of a seat position to a comfort position by the passenger is restricted. If a driving pilot is able to execute a driving task only during the day because passive camera systems are impaired in their functionality at night, for instance, the seat position is adjusted to an upright position at dusk and/or an adjustment of the seat position to a comfort position by the passenger is restricted. Such a specific embodiment of the presented approach offers the advantage that in a weather-related and/or time-of-day-related switchover of the vehicle from an automated to a manual driving mode, the vehicle driver is able to rapidly and safely assume the driving task as well as the safe control of the vehicle by adapting his or her seat position. In this context, it is furthermore possible to call up a weather-related and/or time-of-day-related switch of the vehicle from an automated to a manual driving mode in the form of a map, for instance, either directly for a vehicle or indirectly via an accident probability map, a coefficient of friction map and/or a weather map. In this instance, an 'environment sensor' may be understood both as a "classic" environment sensor such as a radar, video, ultrasonic or lidar sensor, but also as signals that realize a "virtual sensor" and whose ascertained or recorded data are transmitted via radio, for example, such as weather maps, radio traffic service, weather-related warnings, information from other road users such as their assessment of the environment, coefficient of friction maps, positional signals (directly or also indirectly through run time differences of highly precise chronological times such as in GPS) and/or chronological times or time of day information.

Furthermore, according to one specific embodiment, in the step of determining, the transition signal is able to be determined using a comparison signal received via an interface (e.g., to a camera unit of the vehicle), the comparison signal in particular representing a comparison of a driving direction of the vehicle to a zenith angle of the sun, the step of providing an adjustment signal being executed when the comparison signal represents travel of the vehicle under characteristic light conditions that cause a switch of the vehicle from an automated driving mode to a manual driving mode. For instance, a low zenith angle of the sun may be defined as a characteristic light condition that could lead to a poorer detection capability of the camera unit. As soon as the vehicle drives toward the sun and/or drives so that the sun is within the field of vision of at least one camera, a seat device may be adjusted to an upright position and/or an adjustment of a seat position to a comfort position by the driver may be restricted. A similar approach is able to be used when dusk is approaching. A detection power of passive camera systems, for example, is dependent on a driving direction of the vehicle; the light conditions while the vehicle is traveling in the direction of the setting sun, for example, are more advantageous than when the vehicle is driving in the opposite direction. A brightness for the detection of additional road users is essential in this context. Such a specific embodiment of the presented approach thus offers the advantage that during a light-induced switchover of the vehicle from an automated to a manual driving mode, the vehicle driver is able to rapidly and safely assume the driving task and the safe control of the vehicle through an adaptation of his seat position. A solution using a map and/or compass is likewise possible in this context. If it is known at which point on the map one is located, then the current and a future orientation are also able to be ascertained on that basis (this is already the case in current navigation devices). The comparison signal is relevant in particular when a camera system is on board and the vehicle is moved so that the sun is or will be located in the image of the camera. This is usually a camera in the driving direction, but the presented approach is not restricted to such a case. There is no need for the camera to recognize the orientation. Thus, the comparison signal does not have to come solely from the camera unit; also conceivable is an embodiment in which the comparison signal is able to be determined and read in via map data, e.g., combined with a satellite navigation device or other locating possibilities, or an electronic compass, in order to determine and read in the actual and anticipated driving direction. The zenith angle of the sun may then be ascertained from the current chronological time, for example, such as via satellite navigation, a radio clock, a vehicle clock or a dedicated real-time clock in combination with the position on earth. With the aid of the camera, on the other hand, it is possible to determine, directly from the sensor data, when a strong impairment is encountered.

According to one specific embodiment, in the step of providing, the adjustment signal is able to be provided in such a way that a change is actuated in a seat position of at least one further seat device of a vehicle, and in the step of providing, the adjustment signal is furthermore provided using a seat occupancy signal, the seat occupancy signal indicating or representing a seat occupancy of the further seat device inside the vehicle. Such an embodiment of the approach presented here offers the advantage that in the event of a looming accident danger, for instance, a position of a seat device of a front-seat passenger is likewise adjusted from a comfort position to an upright position so that the protective effect of the seat device and headrest is able to exhibit its optimal protection.

According to one further specific embodiment, in the step of providing, the adjustment signal may furthermore be provided while using a collision signal, the collision signal indicating or representing a (possibly) imminent accident situation of the vehicle, as a result of which a switchover of the vehicle from an automated driving mode to a manual driving mode takes place or may take place. An actual switchover need not necessarily occur in such a case. It is sufficient to bring the passenger into an upright seated position or an upright position of a seat device; thus, this may also already involve a preparation for a transfer, for instance. The adjustment signal and/or the collision signal may thus induce a switchover of a system executing the introduced method to a type of "be alert position", in which the vehicle passenger is in an optimal seated position or a seat device is in an optimal position and is thereby well prepared for a possible accident. Such an embodiment of the introduced approach offers the advantage that in the presence of a high accident risk of a vehicle, the seat devices of the vehicle are no longer able to be adjusted to a comfort position in which an injury risk of a passenger and/or the passengers of the vehicle could arise that is potentially greater than in an upright seated position or an upright position of a seat device. As a result, the injury risk of the passengers of a vehicle is able to be limited by restricting the possible seated position or the position of a seat device as a function of an accident risk.

In addition, in the presence an increased accident risk, such an embodiment of the approach presented here may offer the advantage, for example, that in particular a position of a seat device is furthermore able to be adjusted so that a passenger and/or the passengers of the vehicle is/are brought into a position that was deemed safe in particular by crash tests, and/or which may be considered to be a particularly safe position.

In one further embodiment, in the step of providing, the adjustment signal may be provided in response to an end signal, the end signal indicating or representing a conclusion of a current automated driving operation of the vehicle. In this way, the vehicle may then be switched from an automated driving mode to a manual driving mode once the vehicle reaches an end of the area able to be driven by the driving pilot, for example, and/or an end of a partial route to be driven.

For instance, this may be the case when an expressway pilot approaches an exit and/or the vehicle approaches a construction site through which it may not pass. Such an embodiment of the presented approach thus offers the advantage that in a switchover of the vehicle from an automated to a manual driving mode, the vehicle driver is able to a rapidly and safely assume the driving task as well as the safe control of the vehicle by adapting his seated position or adapting the position of a seat device.

According to one embodiment, the present method may have a step of releasing a mechanical anchor and/or an electromechanical adjustment unit of the seat device using the adjustment signal for the purpose of changing the comfort position to the upright position. The release of the mechanical anchor is triggered pyrotechnically, for example, thereby making it possible to bring even manually adjustable seat devices from a comfort position to an upright position. In one further embodiment, the seat is adjusted electromechanically so that the most comfortable adjustment possible is carried out. This is possible especially when no particularly rapid reaction is required, e.g., in a gradual worsening of the measured sensor data due to a slow buildup of ice, for instance. This makes it possible to avoid jerky movements. A release of a mechanical anchor may also be understood as an electromechanical movement of the seat device so that the seat adjustment is first released in order to make an adjustment to a new position, in particular the upright position. It is furthermore conceivable that a movement of the seat takes place with the aid of electric motors since they are already installed in the vehicle and the adjustment is therefore achieved in a cost-effective manner. Such an embodiment of the introduced approach offers the advantage of allowing for an uncomplicated and rapid adjustment of a seated position or the position of a seat device, in particular in critical situations that require a fast reaction by the driver.

According to one further embodiment, in the step of providing, a blocking signal may be output in response to the transition signal if the position signal indicates or represents an upright position, the blocking signal blocking an adjustment of the upright position to the comfort position by the passenger. In this context, an adjustment of the seat device may already be restricted prior to switching the vehicle from an automated driving mode to a manual driving mode. For example, half a minute before executing the switchover, the seat device may be adjusted from a comfort position to the upright position. One minute prior to executing the switchover, for instance, an adjustment of the upright position to the comfort position of the seat device by the passenger is able to be blocked if the seat device is already in the upright position. Such am embodiment of the introduced approach offers the advantage, for instance, that a thoughtless adjustment of the position of a seat device, in particular by the passenger himself, is prevented so that the injury risk of the passengers of a vehicle is able to be limited by restricting the possible position of a seat device as a function of a malfunction probability of a vehicle sensor and/or an accident danger.

Also advantageous is a differentiation between an active resetting and the blocking of the comfort position as a function of a probability of a switchover of the vehicle from an automated driving mode to a manual driving mode. Given a low switchover probability, for example, the vehicle driver may thereby be in a comfort position that the driver perceives as pleasant. In contrast, if the switchover probability is greater, then an adjustment of an upright position to a comfort position is prevented or only an adjustment of a comfort position to an upright position is allowed. If a switchover of the vehicle from an automated to a manual driving mode is absolutely necessary because of a critical situation, then the vehicle driver is slowly and comfortably brought to the upright position. During an acute switchover of the vehicle from an automated to a manual driving mode, an adjustment of the position of a seat device is thereby able to be carried out in a rapid and uncomplicated manner despite the previous comfort position.

Finally, according to one embodiment, in the step of providing, the adjustment signal may be provided in such a way that a change in a position of a steering device, an inside mirror, a side mirror, a holder and/or a table inside the vehicle is/are brought about. It is therefore possible to install holders for securing objects, e.g., mobile devices or books. Such an embodiment of the introduced approach offers the advantage that the introduced approach allows for many application possibilities in the area of automated driving, so that in a spontaneous switchover of the vehicle from an automated to a manual driving mode, the driver is able to rapidly and safely assume the driving task as well as the safe control of the vehicle in addition to an adaption of the position of his seat device, by changing a position of the steering device, the inside mirror, the side mirror, the holder and/or the table inside the vehicle.

The introduced method for adapting a position of a seat device of a vehicle during a switchover of the vehicle from an automated driving mode to a manual driving mode, for example, may be implemented in software or hardware or in a mixed form of software and hardware such as in a control unit.

In addition, the introduced approach provides a device, which is developed to carry out, actuate or implement the steps of a variant of an introduced method for adapting a position of a seat device of a vehicle during and/or prior to a switchover of the vehicle from an automated driving mode to a manual driving mode in corresponding devices. This variant of an embodiment of the invention in the form of a device is also able to achieve the objective on which the present invention is based in a rapid and efficient manner.

Toward this end, the device for adapting a position of a seat device of a vehicle during a switchover of the vehicle from an automated driving mode to a manual driving mode may have at least one processing unit for processing signals or data; at least one memory unit for storing signals or data; at least one interface to a sensor or to an actuator for reading in sensor signals from the sensor or for outputting data or control signals to the actuator; and/or at least one communications interface for reading in or outputting data which are embedded in a communications protocol. The processing unit, for example, may be a signal processor, a microcontroller or the like, and the memory unit may be a flash memory, an EEPROM or a magnetic memory unit. The communications interface may be developed to read in or output data in a wireless and/or wire-conducted manner, and a communications interface, which is able to read in or output wire-conducted data, outputs these data, electrically or optically, for example, from a corresponding data transmission line or outputs it onto a corresponding data transmission line.

In the present case, a device may be understood as an electrical device, which processes sensor signals and outputs control and/or data signals as a function thereof. The device may encompass an interface which may be developed in the form of hardware and/or software. In the case of a hardware development, the interfaces may be part of what is known as a system ASIC, for instance, which encompasses a wide variety of functions of the device. However, it is also possible that the interfaces are discrete, integrated switching circuits or are at least partially made up of discrete components. In a software development, the interfaces may be software modules, which are provided on a microcontroller in addition to other software modules, for example.

Also advantageous is a computer program product or a computer program having program code, which may be stored on a machine-readable carrier or memory medium such as a semiconductor memory, a hard disk memory or an optical memory, and which is used for carrying out, implementing and/or actuating the steps of the present method as recited in one of the afore-described embodiments, in particular when the program product or program is executed on a computer or a device.

Exemplary embodiments of the introduced approach are illustrated in the figures and described in greater detail in the following description.

DETAILED DESCRIPTION

Figure 1:
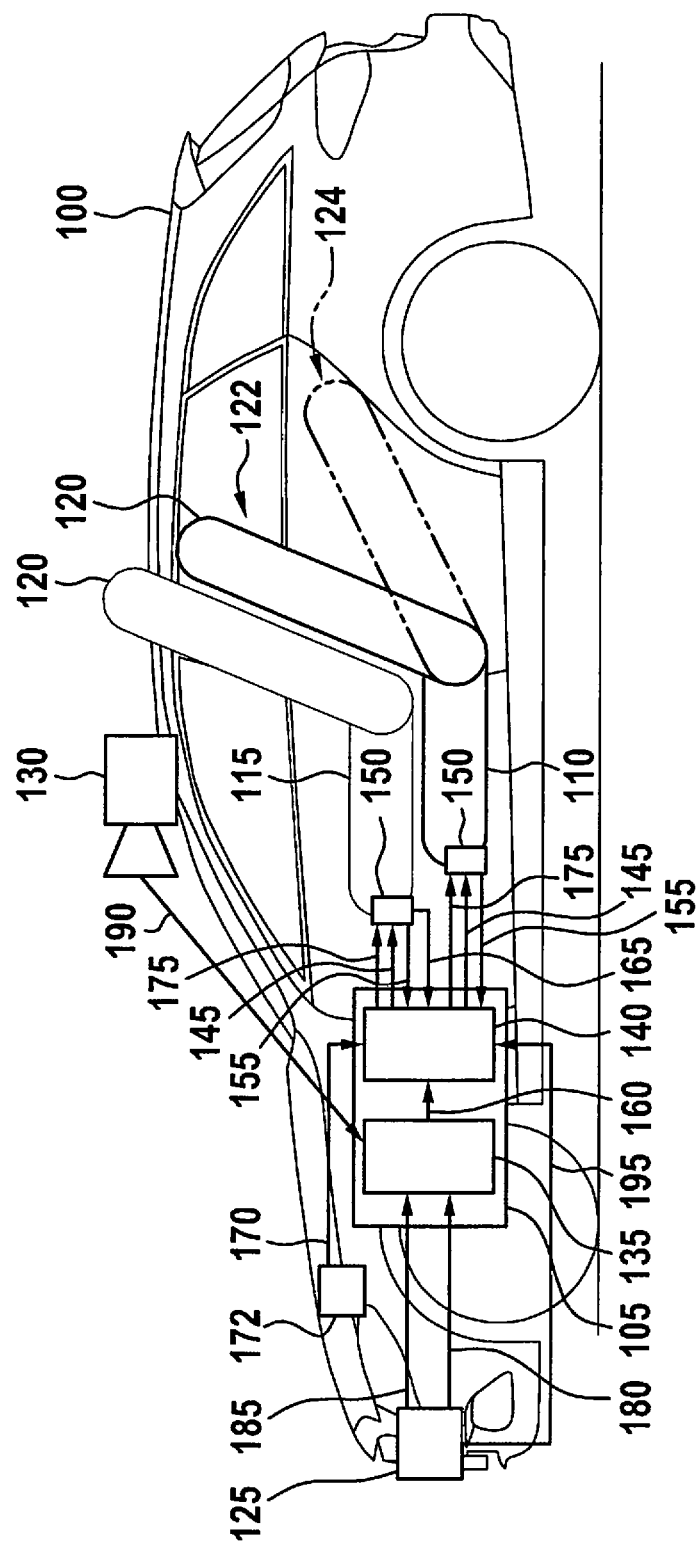
FIG. 1 shows a schematic illustration of a vehicle having a device for adapting a position of a seat device of a vehicle during a switchover of the vehicle from an automated driving mode to a manual driving mode according to one exemplary embodiment.

In the following description of advantageous exemplary embodiments of the present invention, identical or similar reference numerals are used for the elements that are shown in the various figures and that have a similar effect, and a repeated description of these elements is omitted.

FIG. 1 shows a schematic illustration of a vehicle 100 having a device 105 for adapting a position of a seat device 110 of vehicle 100 during a switchover of vehicle 100 from an automated driving mode to a manual driving mode according to one exemplary embodiment.

By way of example, vehicle 100 has first seat device 110 and a further seat device 115. An individual backrest 120 of first seat device 110 and further seat device 115 is able to be arrested in at least two positions. In addition, it is also conceivable that first seat device 110 and/or further seat device 115 is/are developed so that the initial position is a third position, which lies between the comfort position and the upright position. When the comfort position is blocked, a passenger is able to shift the seat closer toward the upright position but not in the direction of the comfort position. Arresting may also be understood as the possibility of a continuous adjustment in which a (quasi) fluid adjustment is able to be undertaken.

By way of example, first seat device 110 and further seat device 115 have an upright position 122; a dashed development of seat device 110 illustrates an exemplary comfort position 124 in which backrest 120 of first seat device 110 is adjusted to a reclining position. In order to most optimally assist a passenger during a switchover of vehicle 100 from an automated driving mode to a manual driving mode, a change in the position of a seat device is able to be carried out in particular even before the switch from the automated to the manual driving mode. For this purpose, vehicle 100 has vehicle-internal device 105 for adapting a position of a seat device of vehicle 100 during a switchover of vehicle 100 from an automated driving mode to a manual driving mode. According to one exemplary embodiment, at least one environment sensor 125 and at least one camera unit 130 is/are also situated on vehicle 100. Within the framework of the switchover preparation, it is furthermore possible to bring the passenger into the upright position but to still operate the vehicle in the automated driving mode for a very long time, in the extreme case even until the destination has been reached, without the passenger having to intervene.

According to one exemplary embodiment, device 105 has a determination device 135 and a provision device 140. Here, provision device 140 is exemplarily developed to provide an adjustment signal 145 to an individual interface 150 to first seat device 110 and further seat device 115, adjustment signal 145 causing a change in the position of a seat device to be carried out. With the aid of adjustment signal 145, first seat device 110 in particular is able to be actuated in such a way that backrest 120 of first seat device 110, for example, is brought from an exemplary reclining comfort position 124 to upright position 122. To do so, an actuator of first seat device 110, for instance, is actuated so that backrest 120 is adjusted. Provision device 140 is furthermore developed to receive a position signal 155 supplied by first seat device 110 and second seat device 115 and to receive a transition signal 160 supplied by determination device 135, and to supply adjustment signal 145 using position signal 155 and transition signal 160.

Provision device 140 is furthermore developed to provide adjustment signal 145 in response to a seat occupancy signal 165, which indicates or represents a seat occupancy of further seat device 115 inside vehicle 100, the signal being provided in such a way that a change in the position of the at least one further seat device 115 will be actuated.

Provision device 140 is additionally developed to provide adjustment signal 145 in response to an end signal 170, end signal 170 indicating or representing a conclusion of a current automated driving operation of vehicle 100. For example, a control unit 172 of a driver assistance system of vehicle 100 provides end signal 170 to provision device 140.

If first seat device 110 and/or second seat device 115 of vehicle 100 is/are already in an upright position 122, provision device 140 is developed to output a blocking signal 175 to first seat device 110 and/or second seat device 115 in response to transition signal 160, blocking signal 175 blocking an adjustment of upright position 122 to a comfort position 124 by the passenger.

Determination device 135 is initially developed to determine transition signal 160 with the aid of a probability value 180, which represents an item of information pertaining to a probability of a spontaneous switchover of vehicle 100 from an automated driving mode to a manual driving mode, and/or to an item of information about a remaining period of time and/or a remaining driving distance until vehicle 100 is switched from an automated driving mode to a manual driving mode. Here, probability value 180 exemplarily depends on a failure probability of a vehicle sensor such as environment sensor 125 and/or camera unit 130, in which case a failure of the vehicle sensor would lead to a switchover of vehicle 100 from an automated driving mode to a manual driving mode because the driving safety could no longer be ensured in the event of a failure of the vehicle sensor.

Determination device 135 is furthermore developed to determine transition signal 160 using an environment signal 185 received from environment sensor 125 of vehicle 100. Provision device 140 provides adjustment signal 145 when environment signal 185 represents a change in the weather and/or a change in the time of day, as a result of which a switchover of vehicle 100 from an automated driving mode to a manual driving mode takes place. Transition signal 160 may be determined by additionally using a comparison signal 190 received from camera unit 130 of vehicle 100. In this case, adjustment signal 145 is provided by provision device 140 when comparison signal 190 represents travel of vehicle 100 under characteristic light conditions that cause a switchover of vehicle 100 from an automated driving mode to a manual driving mode.

According to one exemplary embodiment, environment sensor 125 is developed to detect the environment of vehicle 100. Environment sensor 125 is exemplarily developed to use detected environment data for determining a collision signal 195, which indicates or represents a (possibly) looming accident situation of vehicle 100 with an object, a person and/or an infrastructure feature, and to provide it to provision device 140 because a direct switchover of vehicle 100 from an automated driving mode to a manual driving mode takes place on account of the detected accident situation.

Figure 2:
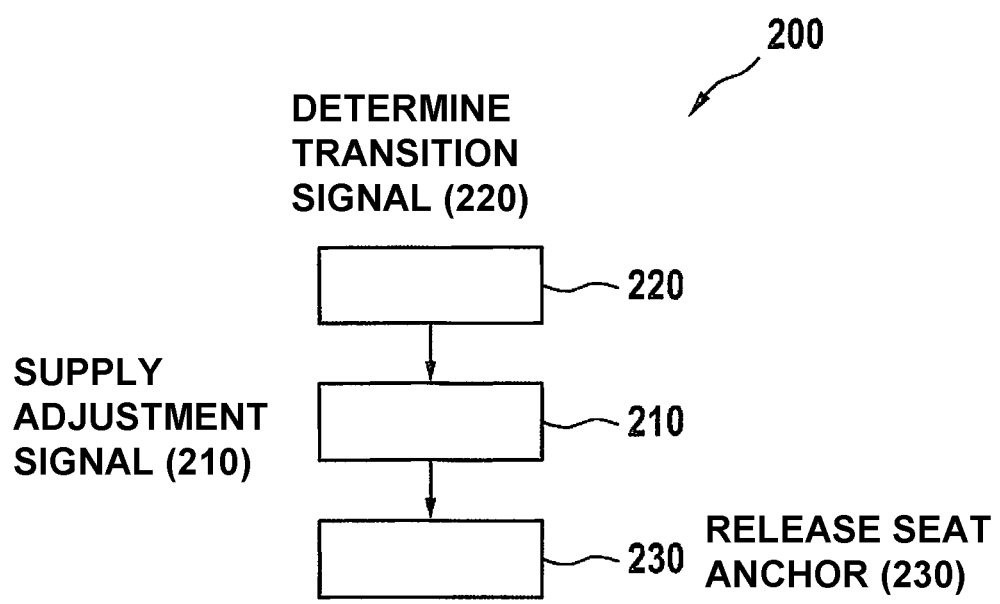
FIG. 2 shows a flow diagram of an exemplary embodiment of a method for adapting a position of a seat device of a vehicle during and/or prior to a switchover of the vehicle from an automated driving mode to a manual driving mode according to one exemplary embodiment.

FIG. 2 shows a flow diagram of an exemplary embodiment of a method 200 for adapting a position of a seat device of a vehicle during and/or prior to a switchover of the vehicle from an automated driving mode to a manual driving mode according to an exemplary embodiment. Method 200 according to an exemplary embodiment is able to be executed on the device for adapting a position of the seat device of a vehicle during a switchover of the vehicle from an automated driving mode to a manual driving mode from FIG. 1.

To begin with, method 200 has a step 210 in which an adjustment signal is supplied to an interface to a seat device of the vehicle using a transmission signal and a position signal, the adjustment signal causing a change in the position of the seat device from a comfort position to an upright position. The adjustment signal is provided when the position signal indicates or represents the comfort position of the seat device, and/or is not provided when the position signal indicates or represents the upright position of the seat device. In addition, method 200 has a step 220 in which the transition signal is determined using a probability value and/or an environment signal and/or a comparison signal, for instance. The transition signal represents an upcoming transition from an automated driving mode to a manual driving mode of the vehicle. Finally, in a step 230 of method 200, a mechanical anchor of the seat device is released using an adjustment signal in order to change from the comfort position to the upright position.

If an exemplary embodiment includes an "and/or" linkage between a first feature and a second feature, then this should be read to indicate that the exemplary embodiment according to one embodiment includes both the first feature and the second feature, and according to a further embodiment, includes either only the first feature or only the second feature.

What is claimed is:

1. A method for adapting a position of a seat device of a vehicle at least one of during and prior to a switchover of the vehicle from an automated driving mode to a manual driving mode, the method comprising:
   providing an adjustment signal to an interface to the seat device of the vehicle using a transition signal and a position signal, wherein the adjustment signal causes a change in the position of the seat device from a comfort position to an upright position, wherein the transition signal indicates an upcoming transition from the automated driving mode to the manual driving mode of the vehicle, and wherein the position signal indicates the position of the seat device, wherein the adjustment signal is provided when the position signal indicates the comfort position;
   providing a blocking signal in response to the transition signal when the position signal indicates the upright position, wherein the blocking signal blocks an adjustment of the upright position to the comfort position by a passenger; and
   determining the transition signal by using a probability value that represents an item of information pertaining to a probability of a spontaneous switchover of the vehicle from the automated driving mode to the manual driving mode.

2. The method as recited in claim 1, further comprising:
   determining the transition signal by also using a probability value that represents an item of information pertaining to at least one of a remaining period of time and a remaining driving distance until the vehicle is switched from the automated driving mode to the manual driving mode.

3. The method as recited in claim 2, wherein in determining, the transition signal is determined using an environment signal received via an interface to an environment sensor of the vehicle, and in the step of providing the adjustment signal, the adjustment signal is executed when the environment signal represents at least one of a change in the weather and a change in a time of day, as a result of which the switchover of the vehicle from the automated driving mode to the manual driving mode takes place.

4. The method as recited in claim 2, wherein in determining, the transition signal is determined using a comparison signal received via an interface, the comparison signal representing a comparison of a driving direction of the vehicle with a zenith angle of the sun, the step of providing the adjustment signal being executed when the comparison signal represents a travel of the vehicle under characteristic light conditions that cause the switchover of the vehicle from the automated driving mode to the manual driving mode.

5. The method as recited in claim 1, wherein in the providing of the adjustment signal, the adjustment signal is provided so that a change in a position of at least one further seat device is actuated, and wherein in the step of providing the adjustment signal, the adjustment signal is provided using a seat occupancy signal that one of indicates and represents a seat occupancy of the further seat device inside the vehicle.

6. The method as recited in claim 1, wherein in the providing of the adjustment signal, the adjustment signal is provided using a collision signal that one of indicates and represents accident risk of the vehicle, as a result of which the switchover of the vehicle from the automated driving mode to the manual driving mode takes place.

7. The method as recited in claim 1, wherein in the providing of the adjustment signal, the adjustment signal is provided in response to an end signal, the end signal one of indicating and representing a conclusion of a current automated driving operation of the vehicle.

8. The method as recited in claim 1, further comprising:
   releasing at least one of a mechanical anchor and an electromechanical adjustment unit of the seat device using the adjustment signal to change the comfort position to the upright position.

9. The method as recited in claim 1, wherein in the providing of the adjustment signal, the adjustment signal is provided so that a change in a position of at least one of a steering device, an inside mirror, a side mirror, a holder, and a table in a vehicle interior is brought about.

10. A device for adapting a position of a seat device of a vehicle at least one of during and/or prior to a switchover of the vehicle from an automated driving mode to a manual driving mode, comprising:
    an arrangement for providing an adjustment signal to an interface to the seat device of the vehicle using a transition signal and a position signal, wherein the adjustment signal causes a change in the position of the seat device from a comfort position to an upright position, wherein the transition signal indicates an upcoming transition from the automated driving mode to the manual driving mode of the vehicle, and wherein the position signal indicates the position of the seat device, wherein the adjustment signal is provided when the position signal indicates the comfort position; and an arrangement for providing a blocking signal in response to the transition signal when the position signal indicates the upright position, wherein the blocking signal blocks an adjustment of the upright position to the comfort position by a passenger;

wherein the transition signal is determined by using a probability value that represents an item of information pertaining to a probability of a spontaneous switchover of the vehicle from the automated driving mode to the manual driving mode.

11. A non-transitory computer readable medium having a computer program, which is executable by a processor, comprising:

a program code arrangement having program code for adapting a position of a seat device of a vehicle at least one of during and/or prior to a switchover of the vehicle from an automated driving mode to a manual driving mode, by performing the following:

providing an adjustment signal to an interface to the seat device of the vehicle using a transition signal and a position signal, wherein the adjustment signal causes a change in the position of the seat device from a comfort position to an upright position, wherein the transition signal indicates an upcoming transition from the automated driving mode to the manual driving mode of the vehicle, and wherein the position signal indicates the position of the seat device, wherein the adjustment signal is provided when the position signal indicates the comfort position;

providing a blocking signal in response to the transition signal when the position signal indicates the upright position, wherein the blocking signal blocks an adjustment of the upright position to the comfort position by a passenger; and determining the transition signal by using a probability value that represents an item of information pertaining to a probability of a spontaneous switchover of the vehicle from the automated driving mode to the manual driving mode.

12. The non-transitory computer readable medium of claim 11, further comprising:

determining the transition signal by using a probability value that represents at least one of:

an item of information pertaining to a probability of a spontaneous switchover of the vehicle from the automated driving mode to the manual driving mode, and/or an item of information pertaining to at least one of a remaining period of time and a remaining driving distance until the vehicle is switched from the automated driving mode to the manual driving mode.

* * * * *